Dec. 28, 1926.

C. H. LAIRD 1,612,589

VEHICLE TRAILER

Filed June 29, 1922

INVENTOR.
CHARLES H. LAIRD.
BY A. B. Bowman
ATTORNEY

Patented Dec. 28, 1926.

1,612,589

UNITED STATES PATENT OFFICE.

CHARLES H. LAIRD, OF SAN DIEGO, CALIFORNIA.

VEHICLE TRAILER.

Application filed June 29, 1922. Serial No. 571,593.

My invention relates to vehicle trailers, particularly to trailers which will track and may be braked simultaneously with the preceding vehicle, and the objects of my invention are: first, to provide a trailer of this class in which the wheels are all vertically pivoted; second, to provide a vehicle trailer of this class in which the rear wheels are shifted in an opposite direction from the front wheels; third, to provide a trailer of this class with novel front wheel steering means; fourth, to provide a vehicle trailer of this class with novel rear wheel steering or shifting means; fifth, to provide a trailer of this class with brake means on laterally shiftable wheels; sixth, to provide a trailer of this class with flexible brake means on all wheels; seventh, to provide novel brake actuating means; eighth, to provide novel trailer coupling means; ninth, to provide a novelly constructed trailer of this class by which several trailers may be connected together and follow in each other's tracks, and tenth, to provide a trailer of this class which is very simple and economical of construction proportionate to its functions, durable, efficient, easy to adjust, operate, connect and disconnect to another vehicle and which will not readily deteriorate or get out of order.

Figure 1:
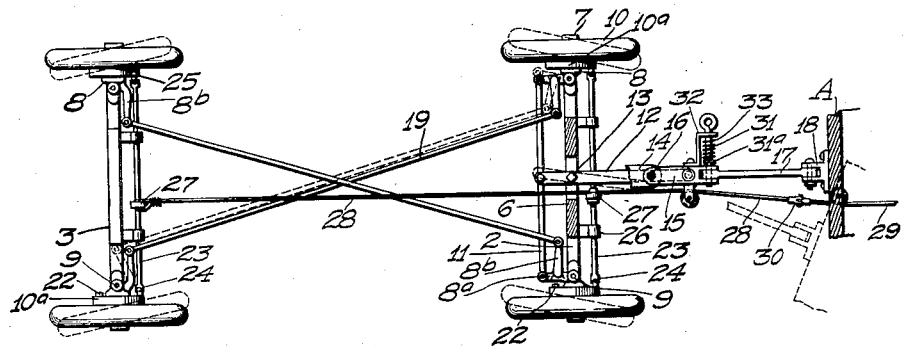
Figure 2:
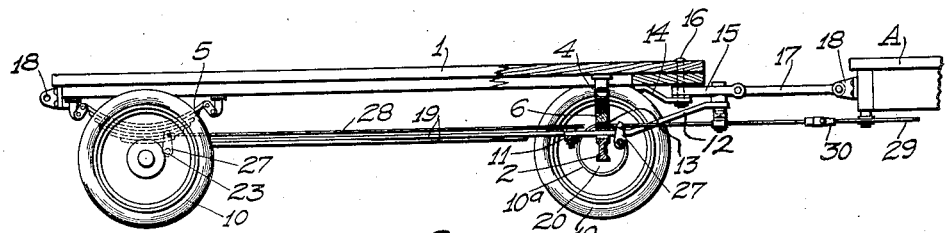
Figure 3:
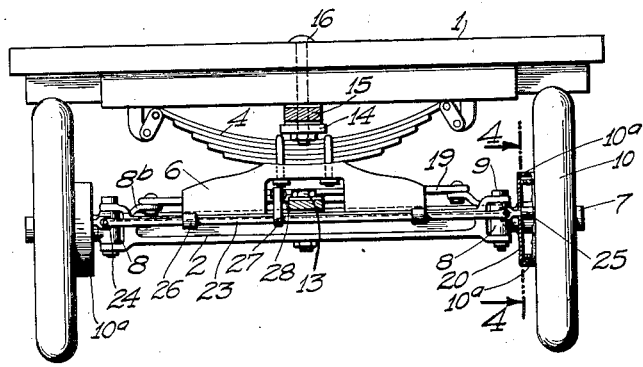
Figure 4:
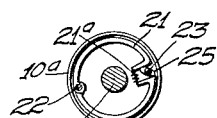

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a plan view of a trailer connected to another vehicle shown fragmentarily, with the platform or body removed and other parts shown in section to facilitate the illustration and showing by dotted lines the position of a fragmentary portion of the preceding vehicle when turning and showing by dotted lines positions of various portions of the trailer when the same is turning with the preceding vehicle; Fig. 2 is a side elevational view thereof with one of the front wheels removed and other parts broken away and in section to facilitate the illustration; Fig. 3 is a front view of the trailer with some of the parts broken away and in section, also to facilitate the illustration; Fig. 4 is a sectional view taken through 4—4 of Fig. 3.

Like characters of reference refer to similar parts and portions throughout the several views of the drawings.

The body 1, front axle 2, rear axle 3, springs 4 and 5, bolster 6, hub nut 7, axle spindle members 8, bolts 9, wheels 10, steering shift rod 11, shift lever 12, bolt 13, support 14, draft member 15, bolt 16, connecting link 17, coupling bracket member 18, diagonal rods 19, brake shoe supporting plates 20, brake shoe members 21, bolts 22, brake actuating rods 23, universal joint members 24, cams 25, supports 26, arms 27, cables 28 and 29, coupling 30, latch bolt 31, bracket 32, and the spring 33 constitute the principal parts and portions of my vehicle trailer structure.

The body 1 is preferably resiliently mounted on the front axle 2 and rear axle 3 by the springs 4 and 5 at the front and rear of the trailer, respectively. A bridged bolster 6 is interposed between the forward spring 4 and the front axle 2. A vertically pivoted axle spindle member 8 is provided at each end of the front and rear axles and is secured to said ends by the bolts 9. A wheel 10 is revolubly mounted on each of said axle spindle members and secured thereon by a hub nut 7. Said front axle spindles are provided with backwardly extending lever portions 8ª which are connected laterally with each other by the steering shift rod 11. A shifting lever 12 is pivotally mounted on the upper side of the front axle by a bolt 13. Said shift lever extends backwardly from said front axle and is pivotally connected at its rear end with the steering rod 11. Said shift lever also extends forwardly from the front axle and is pivotally connected at said forward end to the forwardly extending draft member 15. Said draft member 15 is pivotally mounted in a horizontal plane on the body 1 by means of a bolt 16 which extends downwardly through said body and the supporting member 14 which member is secured to said body and supports the member 15 from below. The preceding or draft vehicle A is preferably provided with a coupling bracket member 18 preferably as shown in Figs. 1 and 2 of the drawings and is pivotally connected to the draft member 15 by a connecting link 17. The link is preferably so connected to the draft member that it may be easily disconnected without the necessity of removing or the possibility of losing parts. In Fig. 1 of the drawings I have shown a pivotal bolt 31 which is longitudinally shiftable in the members 15 and 17 and in a supporting bracket 32. Said bolt is provided with a shoulder 31ª between the outer side of which and the bracket 32 is interposed a compression spring 33, thus permitting said bolt to be freely partly withdrawn and automatically held in an inward or engaging position.

The forward axle spindle members 8 are provided with inwardly extending lever portions 8ᵇ substantially parallel with the front axle, which ends are pivotally connected to similar inwardly extending lever portions 8ᵇ provided on the rear axle spindles 8 by the diagonal rods 19 connecting the respective diagonally positioned axle spindles.

All of said axle spindles 8 are also provided with brake supporting plates 20 to which two brake shoes 21 are pivotally secured by the bolts 22. Said brake shoes are adapted to fit into brake drums 10ª provided on the inner side of each of said wheels 10. Said brake shoes are operated by cams 25 which are connected to the brake actuating rods 23 at the front and rear wheels by universal joint members 24. The various brake shoes are kept from engagement with said brake drums by tension springs 21ª secured to the free ends of said brake shoes. Said brake actuating rods 23 are shiftably and revolubly mounted in supports 26 secured at the front sides of the front and rear axles respectively, which supports may be provided with elongated holes to permit the lateral movement of the rod, or the rod may be permitted to bend as desired. Each of said sliding rods are provided with upwardly extending arms 27 which are connected at their free ends by a cable 28, which cable 28 extends forwardly and is connected to a similar cable 29 on the preceding vehicle by a cable coupling 30.

It is obvious that by the shifting of the preceding vehicle to the position shown by dotted lines in Fig. 1 of the drawings, the draft member 15 will be shifted laterally on the bolt 16, shifting with it the shift lever 12 which is pivotally mounted on the forward axle and which shifts the steering shift rod 11 in the opposite direction which shifts the axle spindles 8 and also the wheel 10 in the direction of the movement of the preceding vehicle. It is further obvious that with the connection of the diagonally positioned axle spindles and wheels, which are connected by the rods 19 as described above, the rear wheels will be shifted in the opposite direction from the front wheels, thus making the same follow in the tracks of the forward wheels when the vehicles are moving.

It is also obvious that when the brake is applied on the preceding or draft vehicle A and when the cable 28 is connected to the brake lever of said driving vehicle by means of the cable 29 and the coupling 30, the brake will also be applied to the trailer or all of the trailers connected to said driving vehicle.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

Having thus described my invention what I claim as new and desire to secure by Letters Patent is:

1. A vehicle, including a body, axle spindle members, all of which are vertically pivoted to said body, wheels revolubly mounted on said spindle members, lever means secured to said spindle members, a draft member pivotally secured at its one end to the body, a shifting member pivotally mounted on said body and pivotally connected at its one end to said draft member and at its other end pivotally connected to said lever means, other lever and rod means connecting the lever means of each of two diagonally positioned spindle members, brake means mounted on each of said wheels, laterally shiftable brake rods revolubly supported by said body, universal joint members connecting said brake rods to said brake means, and lever and cable means connected to said brake rods.

2. A vehicle, including a frame, stationary axles secured to said frame, axle spindle members, all of which are vertically pivoted on said stationary axle, lever means secured to said spindle members, a steering rod connecting said lever means at one end of said vehicle, steering lever means connected to said steering rod, rods connecting the lever means of each of two diagonally positioned spindle members, brake means mounted on each of said wheels, laterally shiftable brake rods revolubly supported by said stationary axles, universal joint members connecting said brake rods to said brake means and lever and cable means connected to said brake rod.

In testimony whereof, I have hereunto set my hand at San Diego, California, this 20th day of June, 1922.

CHARLES H. LAIRD.